United States Patent
Sharma et al.

(10) Patent No.: US 12,499,623 B2
(45) Date of Patent: Dec. 16, 2025

(54) SYSTEM AND METHOD FOR RECONSTRUCTING 3D GARMENT MODEL FROM AN IMAGE

(71) Applicant: International Institute of Information Technology, Hyderabad, Hyderabad (IN)

(72) Inventors: Avinash Sharma, Hyderabad (IN); Snehith Routhu, Hyderabad (IN); Astitva Srivastava, Hyderabad (IN); Chandradeep Pokhariya, Hyderabad (IN); Sagar Sai Jinka, Hyderabad (IN)

(73) Assignee: INTERNATIONAL INSTITUTE OF INFORMATION TECHNOLOGY, HYDERABAD, Hyderabad (IN)

( * ) Notice: Subject to any disclaimer, the term of this patent is extended or adjusted under 35 U.S.C. 154(b) by 177 days.

(21) Appl. No.: 18/224,007

(22) Filed: Jul. 19, 2023

(65) Prior Publication Data
US 2024/0029358 A1  Jan. 25, 2024

(30) Foreign Application Priority Data
Jul. 19, 2022  (IN) .............................. 202241041159

(51) Int. Cl.
*G06T 17/20* (2006.01)
*G06T 7/10* (2017.01)
(Continued)

(52) U.S. Cl.
CPC .............. *G06T 17/205* (2013.01); *G06T 7/10* (2017.01); *G06T 7/50* (2017.01); *G06T 7/90* (2017.01);
(Continued)

(58) Field of Classification Search
CPC .......... G06T 17/205; G06T 7/10; G06T 7/50; G06T 9/00; G06T 17/20; G06T 13/40;
(Continued)

(56) References Cited

U.S. PATENT DOCUMENTS

2020/0364533 A1* 11/2020 Sareen .................... G06T 19/00
2022/0215224 A1*  7/2022 Sareen ............... G06Q 30/0621

OTHER PUBLICATIONS

Jinka SS, Srivastava A, Pokhariya C, Sharma A, Narayanan PJ. Sharp: Shape-Aware Reconstruction of People in Loose Clothing. arXiv preprint arXiv:2205. 11948. May 24, 2022.*

(Continued)

*Primary Examiner* — Phu K Nguyen

(57) ABSTRACT

A system and method of reconstructing a three-dimensional (3D) model of a garment using an image are provided. The method includes (i) receiving a two-dimensional (2D) image from a user device associated with a user, (ii) representing the garment into a point cloud of the garment by extracting the garment from the 2D image, and (iii) reconstructing a three-dimensional (3D) image of the 2D image by generating a dense mesh of the garment by (a) splitting the set of 3D points into a mesh based on an image grid structure to identify the missing regions in the point cloud, (b) generating an additional mesh for the missing regions by sampling the set of 3D points on the point cloud using a Poisson surface reconstruction method, and (c) generating a dense mesh by combining the mesh with the additional mesh to fill the missing regions in the point cloud of the garment.

6 Claims, 10 Drawing Sheets

(51) Int. Cl.
  *G06T 7/50* (2017.01)
  *G06T 7/90* (2017.01)
  *G06T 9/00* (2006.01)

(52) U.S. Cl.
  CPC ...... *G06T 9/00* (2013.01); *G06T 2207/10028* (2013.01); *G06T 2207/30196* (2013.01); *G06T 2210/16* (2013.01)

(58) Field of Classification Search
  CPC ............. G06T 7/90; G06T 2207/10028; G06T 2210/16; G06T 2207/30196; G06T 2210/56
  USPC ........................................................ 345/418
  See application file for complete search history.

(56) References Cited

OTHER PUBLICATIONS

Cao Y, Chen G, Han K, Yang W, Wong KY. JIFF: Jointly-aligned Implicit Face Function for High Quality Single View Clothed Human Reconstruction. In2022 IEEE/CVF Conference on Computer Vision and Pattern Recognition (CVPR) Jun. 18, 2022 (pp. 2719-2729). IEEE.*

Jinka SS, Chacko R, Sharma A, Narayanan PJ. Peeledhuman: Robust shape representation for textured 3d human body reconstruction. In2020 International Conference on 3D Vision (3DV) Nov. 25, 2020 (pp. 879-888). IEEE.*

Loper M, Mahmood N, Romero J, et al.(2015), SMPL: A skinned multi-person linear model. ACM Transactions on Graphics (Proc SIG-GRAPH Asia) 34(6):248:1-248:16.*

Zhu H, Cao Y, Jin H, Chen W, Du D, Wang Z, Cui S, Han X. Deep fashion3d: A dataset and benchmark for 3d garment reconstruction from single images. InComputer Vision-ECCV 2020: 16th European Conference, Glasgow, UK, Aug. 23-28, 2020, Proceedings, Part I 16 2020 (pp. 512-530). Springer International Publishing.*

Corona E, Pumarola A, Alenya G, Pons-Moll G, Moreno-Noguer F. Smplicit: Topology-aware generative model for clothed people. InProceedings of the IEEE/CVF conference on computer vision and pattern recognition 2021 (pp. 11875-11885).*

Zakharkin I, Mazur K, Grigorev A, Lempitsky V. Point-based modeling of human clothing. InProceedings of the IEEE/CVF International Conference on Computer Vision 2021 (pp. 14718-14727).*

Nielsen, From Point Clouds to Surfaces: A Tutorial on Surface Reconstruction with Open3D and Python, Jan. 31, 2022, https://www.youtube.com/watch?v=C_WwL2mhxfw&t=7s.*

* cited by examiner

SYSTEM AND METHOD FOR RECONSTRUCTING 3D GARMENT MODEL FROM AN IMAGE

CROSS-REFERENCE TO RELATED APPLICATIONS

This patent application claims priority to pending Indian provisional patent application no. 202241041159 filed on Jul. 19, 2022, the complete disclosures of which, in their entirety, are hereby incorporated by reference.

BACKGROUND

Technical Field

The embodiments herein generally relate to a reconstruction of a three-dimensional (3D) model, and more particularly, to a system and method for reconstructing a two-dimensional (2D) image of a garment into a three-dimensional (3D) image by filling missing regions in point cloud of the garment.

Description of the Related Art

Computer vision (CV) is a field of artificial intelligence (AI) that trains computers to interpret and understand a visual world. Computer vision develops the ability of computers to understand, identify, and classify the objects in the digital images obtained from a camera or video using a deep learning model. There are several applications of CV, like object detection, image segmentation, etc. Since the field of CV is concerned with developing computational theories and methods for the automatic extraction of useful information from digital images, it offers an opportunity to build template-free 3D models directly from real-world scenes with visual realism and accuracy. But several complications are yet to be resolved in attaining accuracy.

Existing systems reconstruct a 3D garment model using template-based and template-free methods. The existing systems use template-based methods that cannot deal with arbitrary garment styles, and the existing systems learn to transfer texture from input images to a predefined garment type. The existing systems use template-free methods that can model arbitrary garments. But either fails to retain texture information or produces vertex-colored mesh. The existing systems involve recovered vertex-colored meshes ((i.e.) blurry appearance) or use a predefined template, which restricts an application to only a small set of garment classes. Moreover, it is a tedious process, with less accuracy, and expensive as well.

Traditionally, expensive multi-view capture setups were employed for garment digitization, but they are not scalable in fast-fashion scenarios due to cost, scan latency, and effort volume. Existing learning-based garment digitization methods rely on predefined 3D template meshes specific to certain clothing styles, obtained from parametric body models like SMPL or designed by artists. The existing methods transfer texture from RGB images to a UV map of a fixed template. However, the traditional methods do not recover textured or vertex-colored meshes. Additionally, the traditional method restricts clothing styles to predefined templates that cannot model arbitrary styles with fine geometric details.

The existing clothed human body reconstruction method either recovers 3D mesh surfaces without texture or texture maps based on fixed SMPL meshes that impose limitations on tight clothing. Texture representation is memory-efficient as high-frequency appearance details can be retained by rendering low-quality meshes with fewer faces. However, digitizing textured 3D garments remains challenging due to the artistic nature of clothing design and the lack of standardization in designing vocabulary Existing template-based garment digitization methods rely on predefined UV-parametrized templates for texture mapping. Although parameterization techniques like Least Squares Conformal Mapping. (LSCM) are utilized for template-free garment reconstruction but the existing template-based garment digitization methods often require manual intervention or lack control over seam placements.

Therefore, there arises a need to address the aforementioned technical drawbacks in existing technologies to reconstruct a 3D garment model from a two-dimensional (2D) image.

SUMMARY

In view of the foregoing, an embodiment herein provides a method for reconstructing a two-dimensional (2D) image of a garment into a three-dimensional (3D) image by filling missing regions in a point cloud of the garment is provided. The method includes receiving a two-dimensional (2D) image from a user device associated with a user. The 2D image includes at least one of a human model or a garment. The method includes representing the garment into a point cloud of the garment by extracting the garment from the 2D image. The point cloud of the garment includes a set of 3D points. The method includes reconstructing a three-dimensional (3D) image by generating, using the point cloud of the garment, a dense mesh of the garment by (i) splitting the set of 3D points into at least one mesh based on an image grid structure to identify the missing regions in the point cloud, The at least one mesh includes vertices that define a shape of the garment, (ii) generating at least one additional mesh for the missing regions by sampling the set of 3D points on the point cloud using a Poisson surface reconstruction method, and (iii) generating a dense mesh by combining the at least one mesh with the at least one additional mesh to fill the missing regions in the point cloud of the garment, thereby reconstructing the 2D image of the garment into the 3D image by filling the missing regions in the point cloud of the garment.

In some embodiments, the method further includes extracting the point cloud from the 2D image by (i) encoding the 2D image using a skinned multi-person linear model (SMPL) to determine an encoded 2D image. The SMPL is a parametric model for representing a human body shape and pose, (ii) decoding the encoded 2D image and the SMPL to determine a decoded 2D image (ii) predicting (i) depth peel maps, (ii) segmentation peel maps, (iii) normal peel maps, and (iv) red green blue (RGB) maps of the 2D image using the decoded 2D image. The depth peel maps comprise predicted distance information related to a first peeling layer of the garment from a viewpoint of the user device. The segmentation peel maps comprise a predicted segmentation label for each pixel in the 2D image of the garment. The normal peel maps comprise a predicted orientation or direction of a surface at each pixel in the 2D image of the garment. The normal peel maps comprise one or more attributes of the surface at each pixel in the 2D image of the garment, (iv) extracting, using a back projection method, the point cloud of the garment by back projecting the depth peel maps of the 2D image of the garment based on the segmentation peel maps, and the normal maps of the 2D image of the garment.

In some embodiments, the method further includes automatically estimating, by a nearest neighbor extrapolation method, seams on the dense mesh of the garment by assigning vertices of the at least one additional mesh to a second peeling layer of nearest vertices of the at least one mesh based on the predicted distance information related to the peeling layer of the garment from a viewpoint of the user device.

In some embodiments, the method further includes constructing an ultraviolet (UV) atlas for the dense mesh by parameterizing, using a UV parameterization method, the dense mesh based on the seams of the dense mesh to improve the surface at each pixel in the dense mesh of the garment.

In some embodiments, the method further includes filling, using an inpainting method, a texture in the constructed UV atlas by assigning RGB value for each pixel of the UV parametrized dense mesh by projecting the UV parametrized dense mesh from UV space to the corresponding RGB peel maps if the regions are missed in the constructed UV atlas.

In one aspect, a system for reconstructing a two-dimensional (2D) image of a garment into a three-dimensional (3D) image by filling missing regions in a point cloud of the garment. The system includes a user device includes an image-capturing device to capture the two-dimensional (2D) image, and a three-dimensional server communicatively connected to the user device. The three-dimensional server includes a memory that includes a set of instructions and a processor executes the set of instructions. The processor is configured to receive the two-dimensional (2D) image from a user device associated with a user. The 2D image includes at least one of a human model, or a garment. The processor is configured to represent the garment into a point cloud of the garment by extracting the garment from the 2D image. The point cloud of the garment includes a set of 3D points. The processor is configured to reconstruct a three-dimensional (3D) image of the 2D image by generating, using the point cloud of the garment, a dense mesh of the garment by (i) splitting the set of 3D points into at least one mesh based on an image grid structure to identify the missing regions in the point cloud. The at least one mesh vertices that define a shape of the garment, (ii) generating at least one additional mesh for the missing regions by sampling the set of 3D points on the point cloud using a Poisson surface reconstruction method and (iii) generating a dense mesh by combining the at least one mesh with the at least one additional mesh to fill the missing regions in the point cloud of the garment, thereby reconstructing the 2D image of the garment into the 3D image by filling the missing regions in the point cloud of the garment.

In some embodiments, the point cloud is extracted from the 2D human model with the garment image by (i) encoding the 2D image using a skinned multi-person linear model (SMPL) to determine an encoded 2D image. The SMPL is a parametric model for representing a human body shape and pose, (ii) decoding the encoded 2D image and the SMPL to determine a decoded 2D image, (iii) predicting (i) depth peel maps, (ii) segmentation peel maps, (iii) normal peel maps, and (iv) red green blue (RGB) maps of the 2D image using the decoded 2D image. The depth peel maps comprise predicted distance information related to a first peeling layer of the garment from a viewpoint of the user device. The segmentation peel maps comprise a predicted segmentation label for each pixel in the 2D image of the garment. The normal peel maps comprise a predicted orientation or direction of a surface at each pixel in the 2D image of the garment. The normal peel maps comprise one or more attributes of the surface at each pixel in the 2D image of the garment, and (iii) extracting, using a back projection method, the point cloud of the garment by back projecting the depth peel maps of the 2D image of the garment based on the segmentation peel maps, and the normal maps of the 2D image of the garment based on the segmentation peel maps, and the normal maps of the 2D image of the garment.

In some embodiments, the processor is configured to automatically estimate, by a nearest neighbor extrapolation method, seams on the dense mesh of the garment by assigning vertices of the at least one additional mesh to a second peeling layer of nearest vertices of the at least one mesh based on the predicted distance information related to the peeling layer of the garment from a viewpoint of the user device.

In some embodiments, the processor is configured to construct an ultraviolet (UV) atlas for the dense mesh by parameterizing, using a UV parameterization method, the dense mesh based on the seams of the dense mesh to improve the surface at each pixel in the dense mesh of the garment.

In some embodiments, the processor is configured to fill, using an inpainting method, a texture in the constructed UV atlas by assigning RGB value for each pixel of the UV parametrized dense mesh by projecting the UV parametrized dense mesh from UV space to the corresponding RGB peel maps if the regions are missed in the constructed UV atlas.

In another aspect, one or more non-transitory computer-readable storage mediums configured with instructions executable by one or more processors cause the one or more processors to perform a method for reconstructing a two-dimensional (2D) image of a garment into a three-dimensional (3D) image by filling missing regions in the two-dimensional (2D) image of the garment is provided. The method includes receiving a two-dimensional (2D) image from a user device associated with a user. The 2D image includes at least one of a human model or a garment. The method includes representing the garment into a point cloud of the garment by extracting the garment from the 2D image. The point cloud of the garment includes a set of 3D points. The method includes reconstructing a three-dimensional (3D) image of the 2D image by generating, using the point cloud of the garment, a dense mesh of the garment by (i) splitting the set of 3D points into at least one mesh based on an image grid structure to identify the missing regions in the point cloud, the at least one mesh includes vertices that define a shape of the garment, (ii) generating at least one additional mesh for the missing regions by sampling the set of 3D points on the point cloud using a Poisson surface reconstruction method, and (iii) generating a dense mesh by combining the at least one mesh with the at least one additional mesh to fill the missing regions in the point cloud of the garment, thereby reconstructing the 2D image of the garment into the 3D image by filling the missing regions in the point cloud of the garment.

In some embodiments, extracting the point cloud from the 2D image by (i) encoding the 2D image using a skinned multi-person linear model (SMPL) to determine an encoded 2D image. The SMPL is a parametric model for representing a human body shape and pose, (ii) decoding the encoded 2D image and the SMPL to determine a decoded 2D image (ii) predicting (i) depth peel maps, (ii) segmentation peel maps, (iii) normal peel maps, and (iv) red green blue (RGB) maps of the 2D image using the decoded 2D image. The depth peel maps comprise predicted distance information related to a first peeling layer of the garment from a viewpoint of the user device. The segmentation peel maps comprise a predicted segmentation label for each pixel in the 2D image of the garment. The normal peel maps comprise a predicted orientation or direction of a surface at each pixel in the 2D image of the garment. The normal peel maps comprise one or more attributes of the surface at each pixel in the 2D image of the garment, (iv) extracting, using a back projection method, the point cloud of the garment by back projecting the depth peel maps of the 2D image of the garment based on the segmentation peel maps, and the normal maps of the 2D image of the garment.

In some embodiments, the method further includes automatically estimating, by a nearest neighbor extrapolation method, seams on the dense mesh of the garment by assigning vertices of the at least one additional mesh to a second peeling layer of nearest vertices of the at least one mesh based on the predicted distance information related to the peeling layer of the garment from a viewpoint of the user device.

In some embodiments, the method further includes constructing an ultraviolet (UV) atlas for the dense mesh by parameterizing, using a UV parameterization method, the dense mesh based on the seams of the dense mesh to improve the surface at each pixel in the dense mesh of the garment.

In some embodiments, the method further includes filling, using an inpainting method, a texture in the constructed UV atlas by assigning RGB value for each pixel of the UV parametrized dense mesh by projecting the UV parametrized dense mesh from UV space to the corresponding RGB peel maps if the regions are missed in the constructed UV atlas.

The system and method of reconstructing template-free texture 3D garment models. The system helps the users to try the product on 3D models. The 3D models enhance clarity for the end-user about any product virtually. The system adopted a non-parametric peeled representation to model garments that eliminates the need for predefined garment templates that can only accommodate a limited number of styles, mainly tight clothing. The pixel-aligned peelmaps (depth, segmentation, normal, and RGB) allow for easy extraction of individual garments from the reconstructed clothed body. The SMPL peeled depth before being provided to an encoder that enhances both pose and depth ambiguity in a monocular image. The SMPL body segmentation prior assists the segmentation decoder in localizing body parts while predicting garment segmentation labels that ensure accurate extraction of a point cloud of the garment. The non-parametric accurately predicts garment-specific segmentation peelmaps, even for significantly loose clothing styles that may not directly align with the SMPL body segmentation prior. The peeled representation helps in automatic seam estimation, enabling UV parametrization of arbitrary garment meshes. A Dnorm encoder helps reduce point-to-surface (P2S) distance values in the Ddepth predictions. The method generates comprehensive representations of isolated clothing pieces and specific textures details for accurate and detailed digitization of the garment. The method predicts a 3D geometry of the garment utilizing a sparse, non-parametric peeled representation, which effectively reduces self-occlusions.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF THE DRAWINGS

Figure 1:
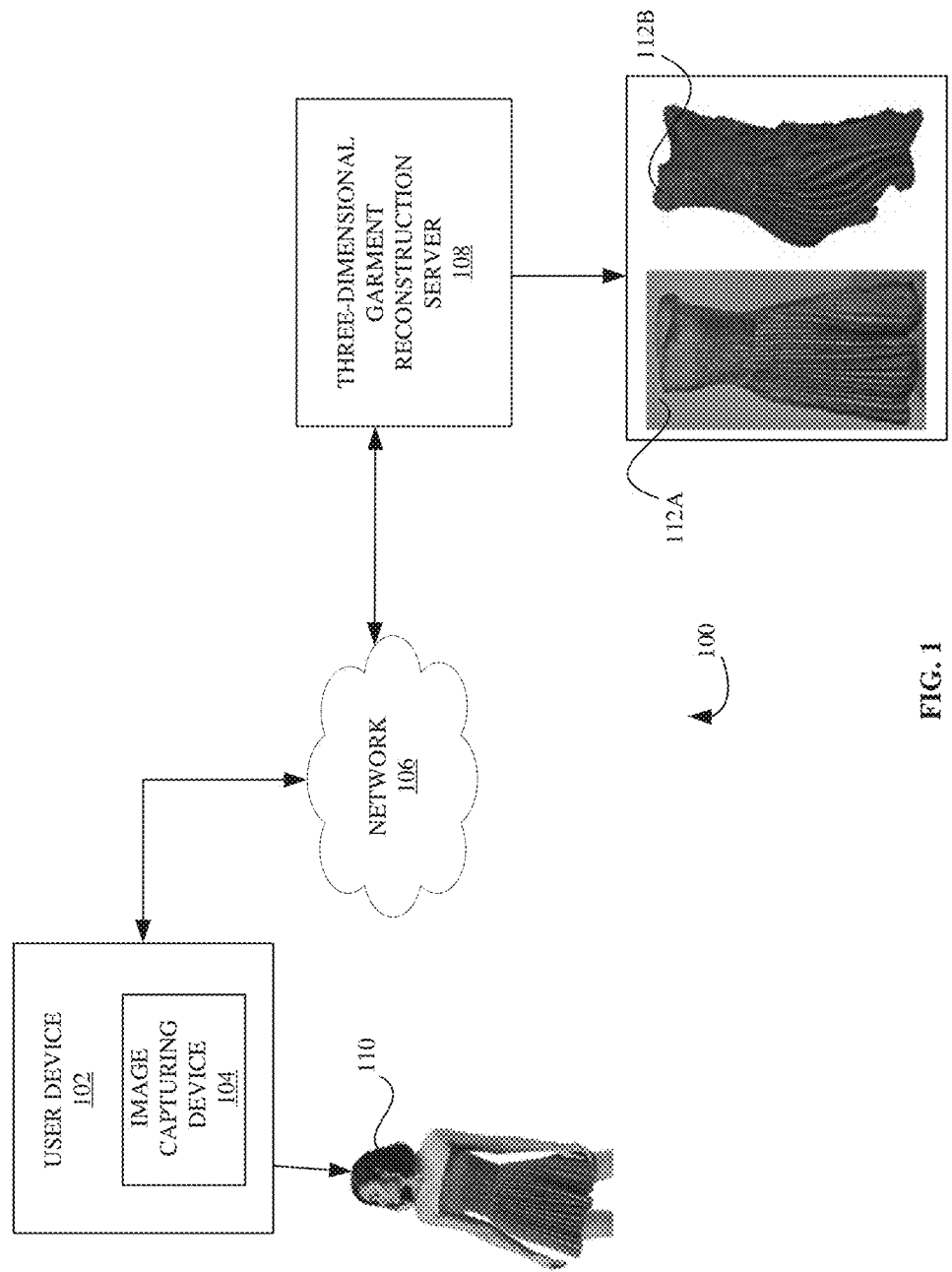
FIG. 1 is a block diagram that illustrates a system for reconstructing a two-dimensional (2D) image into a three-dimensional (3D) image by filling missing regions in a point cloud of the garment according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there is a need for a method and system for reconstructing a two-dimensional (2D) image of a garment into a three-dimensional (3D) image by filling missing regions in a point cloud of the garment according to some embodiments herein. Referring now to the drawings, and more particularly to FIGS. 1 through 10, where similar reference characters denote corresponding features consistently throughout the figures, there are shown preferred embodiments.

FIG. 1 is a block diagram that illustrates a system 100 system for reconstructing a two-dimensional (2D) image 110 into a three-dimensional (3D) image 112A and 112B by filling missing regions in a point cloud of the garment according to some embodiments herein. The system 100 includes a user device 102, and a three-dimensional reconstruction server 108. The user device 102 includes an image-capturing device 104. The image-capturing device 104 includes a virtual camera that captures a two-dimensional (2D) image 110. The two-dimensional (2D) image 110 may be monocular. The image-capturing device 104 is communicatively connected with the 3D garment reconstruction server 108 through the network 106. The network 106 may be a wireless network, a wired network, a combination of a wireless network and a wired network, or the Internet. The 3D garment reconstruction server 108 receives the two-dimensional (2D) image 110 through the network 106. The 2D image includes at least one of a human model, or a garment. The 3D garment reconstruction server 108 without limitation, is selected from a mobile phone, a Personal Digital Assistant (PDA), a tablet, a desktop computer, or a laptop. The 3D garment representation server 108 includes a device processor and a non-transitory computer-readable storage medium storing one or more sequences of instructions, which when executed by the device processor causes the reconstruction of the two-dimensional (2D) image 110 of the garment into the three-dimensional (3D) image 112A and 11B. The image-capturing device 104 may be a camera.

The 3D garment reconstruction server 108 is configured to the two-dimensional (2D) image from the image-capturing device 104. The 3D garment reconstruction server 108 extracts the garment in the form of a point cloud in a 3D space using a back projection method. For example, a person wearing a colorful dress, the 3D garment reconstruction server 108 processes depth maps to identify the dress region. The back projection method estimates 3D positions of points or features within the dress region. The back projection method utilizes the principles of perspective projection, which describe how the 3D garment is projected onto 2D space captured by the image-capturing device 104. The 3D point cloud refers to a collection of points in the 3D space that represents the garment. The collection of points are obtained through the back projection method and are derived from the garment's projections onto the 2D image captured by the image capturing device 104. The 3D point cloud serves as a digital representation of the garment's surface in three dimensions. The 3D point cloud of the garment in 3D space represents a texture of the 3D point cloud of the garment in the 3D space. The 3D garment reconstruction server 108 reconstructs a three-dimensional (3D) image of the 2D image by generating a dense mesh of the garment using the point cloud of the garment. The dense mesh is generated by (i) splitting the set of 3D points into at least one mesh based on an image grid structure to identify the missing regions in the point cloud, (ii) generating at least one additional mesh for the missing regions by sampling the set 3D points on the point cloud using a Poisson surface reconstruction method, and (iii) generating a dense mesh by combining the at least one mesh with the at least one additional mesh to fill the missing regions in the point cloud of the garment. In some embodiments, the 3D garment reconstruction server 108 refines the 3D point cloud by removing noise. The 3D garment reconstruction server 108 partitioned the 3D point cloud based on depth peel maps of the garment to fill missing regions and remove the noise in the point cloud of the garment.

In some embodiments, the set of 3D points have coordinates in three-dimensional space (x, y, z), and the 3D points represent corners or intersections of edges and faces of the mesh. The splitting process connects the set of 3D points with edges to form polygons or triangles, which are grouped to create the faces of the mesh. The mesh allows for defining the shape, surface, and topology of the garment. The mesh includes vertices which are individual 3D coordinates that define the shape of the garment. The vertices are connected by the edges, which form straight lines between pairs of vertices. The edges create the faces which are flat surfaces of the garment. The dense mesh is a collection of mesh with a high density of vertices and faces. The dense mesh has a large number of vertices and a high level of detail in the garment. The faces are polygons, triangles, or quads, that define the surface geometry of the mesh. The number of faces in the dense mesh can vary depending on the level of detail required for the garment representation. A large number of faces allows for a more accurate representation of fine details in the garment. The additional faces define the shape and contours of the garment surface, resulting in a smoother and more realistic appearance. The dense mesh is generated by adding more vertices or the set of 3D points to the mesh, which increases the level of detail and captures finer features of the garment. In complex garment structures, the dense meshes are utilized to accurately represent intricate patterns, textures, and curves of the garment.

The 3D garment reconstruction server 108 splits the set of 3D points into at least one mesh based on the image grid structure by dividing the point cloud data into multiple sections, or meshes, following the layout of the image grid structure. The image grid structure provides a framework for organizing and dividing the 3D point cloud data into separate regions, like how images are organized within a grid. Each mesh represents a distinct section or subset of the point cloud. For example, the point cloud of the garment consists of 1000 3D points. The 3D garment reconstruction server 108 splits these points into three meshes using the image grid structure. Each mesh represents a specific region of the garment. For example, Mesh 1 represents the upper body, Mesh 2 represents the lower body, and Mesh 3 represents the sleeves. The 3D garment reconstruction server 108 identifies any missing regions or gaps in the point cloud. By dividing the point cloud into meshes based on the image grid structure, the 3D garment reconstruction server 108 may be easier for identifying which regions of the point cloud may be incomplete or missing to isolate these missing regions more effectively. In some embodiments, the Poisson surface reconstruction method is a technique used in geometric processing to generate a smooth and watertight surface mesh that is the additional mesh from a set of unorganized 3D points or a point cloud. For example, Mesh 2 (representing the lower body) has some missing regions due to occlusion or incomplete data. To address this, the 3D garment reconstruction server 108 applies the Poisson surface reconstruction method. The 3D garment reconstruction server 108 samples the available 3D points in the point cloud to estimate the missing regions in Mesh 2. The result is an additional mesh, Mesh 2a, that fills in the missing areas. For instance, Mesh 1 represents the upper body, Mesh 2a represents the completed lower body with the missing regions filled, and Mesh 3 represents the sleeves. The combined result is a dense mesh that accurately captures the shape, structure, and surface details of the entire garment.

By utilizing the system 100, users can experience virtual garment try-on in augmented reality (AR), where the system 100 accurately captures the user's body shape and pose from their 2D image, predicts various garment properties and attributes, and generates a 3D model of the garment that aligns with the user's movements and viewpoint. The system 100 enhances the 3D garment model in the realistic and interactive nature of virtual dressing experiences.

Figure 2:
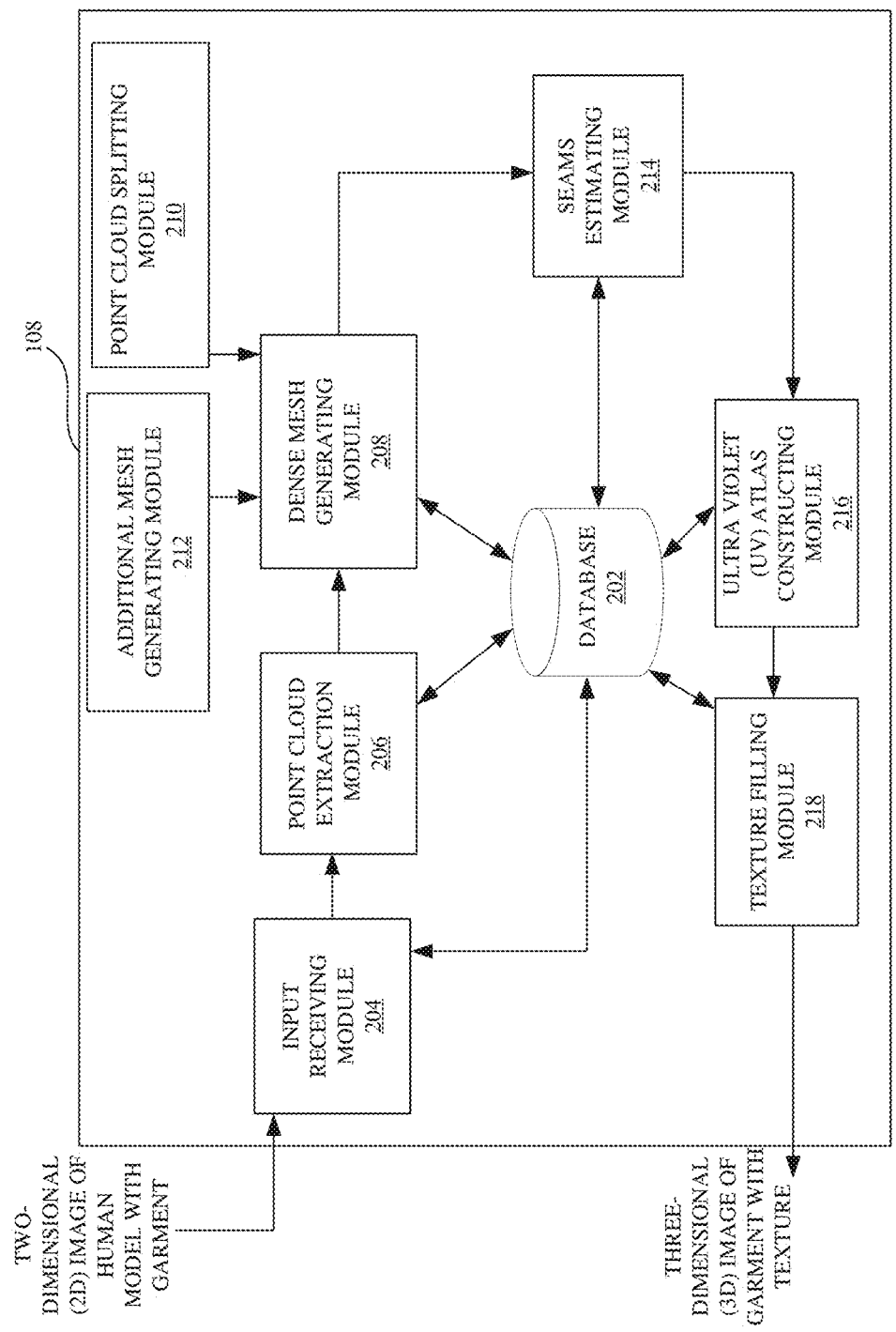
FIG. 2 is a block diagram that illustrates a 3D garment reconstruction server of FIG. 1, according to some embodiments herein.

FIG. 2 is a block diagram that illustrates an exploded view of the 3D garment reconstruction server 108 of FIG. 1, according to some embodiments herein. The 3D garment reconstruction server 108 includes a database 202, an input receiving module 204, a point cloud extraction module 206, a dense mesh generating module 208, a seam estimating module 214, a UV atlas constructing module 216, and a texture filing module 218. The dense mesh generating module 208 includes a point cloud splitting module 210, and an additional mesh generating module 212. The database 200 includes Digital Wardrobe (DW), THUman2.0 dataset, and 3DHuman dataset. The DW includes real human body scans with texture. The scans depict individuals or human body models in various poses and include SMPL body models and segmentation labels. The THUman2.0 dataset contains the real human body scans featuring individuals wearing diverse clothing styles and different poses. The 3D Human dataset includes high-frequency textured scans of specific individuals or the human body models. The scans depict the individuals in diverse poses, wearing garments of arbitrary loose styles.

The input receiving module 204 receives a two-dimensional (2D) image from the user device 102 associated with the user. The point cloud extraction module 206 extracts the garment in a form of a point cloud from the 2D image. The point cloud of the garment includes a set of 3D points. In some embodiments, the 3D point cloud is extracted from the 2D image by encoding the 2D image with a skinned multi-person linear model (SMPL). The encoding process determines a body shape and a pose information of the garment. The SMPL is a parametric model for representing a human body shape and poses. In some embodiments, the 3D point cloud is extracted by transferring the image of the garment along with peeled SMPL (Skinned Multi-Person Linear model (i.e.) depth and body part segmentation) prior to four decoders such that Ddepth, Dseg, Dnorm, and Drgb to predict the depth peel maps $\hat{P}^i_{depth}$, the segmentation peel maps $\hat{P}^i_{seg}$, the normal peel maps $\hat{P}^i_{norm}$, and the RGB peel maps $\hat{P}^i$ rgb respectively. The decoding process extracts detailed information about the body shape and pose of the garment from the encoding.

The 3D garment reconstruction server 108 predicts (i) the depth peel maps, (ii) the segmentation peel maps, (iii) the normal peel maps, and (iv) the RGB maps of the 2D image of the garment by decoding the encoded 2D human model with the garment image and the SMPL. The depth peel maps include predicted distance information related to a peeling layer of the garment from a viewpoint of the user device 102. The segmentation peel maps include a predicted segmentation label for each pixel in the 2D image of the garment. The normal peel map includes a predicted orientation or direction of a surface at each pixel in the 2D image of the garment. The normal peel map includes one or more attributes of the surface at each pixel in the 2D image of the garment. The normal peel map provides information about a surface orientation, such as the normal vector, curvature, or other relevant surface attributes at each pixel location of the garment. The 3D garment reconstruction server 108 further extracts semantic information by assigning semantic labels to various regions of the garment, thereby facilitating the separation of individual clothing pieces within the 2D image.

In some embodiments, the 3D garment reconstruction server 108 computes L1 loss on $\hat{P}^i$ depth & $\hat{P}^i$ rgb, while L2 loss on $\hat{P}^i$ norm with respect to corresponding ground truth peelmaps $\hat{P}^i$, represented by following equations $$L_{depth} = \sum_{i=1}^{4} \left\| \hat{P}^i_{depth} - \mathcal{P}^i_{depth} \right\|$$

$$L_{rgb} = \sum_{i=1}^{4} \left\| \hat{P}^i_{rgb} - \mathcal{P}^i_{rgb} \right\|$$

$$L_{norm} = \sum_{i=1}^{4} (\hat{P}^i_{norm} - \mathcal{P}^i_{norm})$$

The 3D garment reconstruction server 108 minimizes a multiclass cross-entropy loss over the segmentation label represented by the following equation, $$L_{seg} = \Sigma_{c=1}^{N} P_{seg}^c \log(\hat{P}_{seg}^c)$$

Where the N is the total number of semantic segmentation labels.

The 3D garment reconstruction server 108 minimizes total loss by following the equation, $$L = \lambda_{depth} L_{depth} + \lambda_{seg} L_{seg} + \lambda_{norm} L_{norm} + \lambda_{rgb} L_{rgb}$$

The point cloud splitting module 210 splits the set of 3D points or the point cloud into at least one mesh based on an image grid structure to identify the missing regions in the point cloud. In some embodiments, the 3D point cloud of the garment includes a missing region, especially tangential boundaries in the 2D image of the garment. The additional mesh generating module 212 generates at least one additional mesh for the missing regions by sampling the set 3D points on the point cloud using a Poisson surface reconstruction method. The dense mesh generating module 208 generates the dense mesh of the garment by combining the at least one mesh with the at least one additional mesh to fill the missing regions in the point cloud of the garment. In some embodiments, the 3D garment reconstruction server 108 refines the 3D point cloud by inducing an independent partial mesh for each of the depth peel maps by exploiting an image grid structure and inducing another partial mesh by sampling 3D points on the Poisson surface reconstruction of the 3D point cloud to fill the missing region. Further, the dense mesh of the garment is obtained by merging the partial meshes to retain the fine-grained surface details in the predicted depth peel maps while filling holes and missing regions in the point cloud. Additionally, the 3D reconstruction server 108 retains each vertex associated with the dense mesh of the garment with a respective peeling layer. In some embodiments, the 3D reconstruction server 108 reconstructs the 3D point cloud from the monocular image using the predicted segmentation label of the 2D image.

In some embodiments, the 3D point cloud of the garment includes a missing region, especially tangential boundaries in the 2D image of the garment. The seam estimating module 214 automatically estimates seams on the dense mesh of the garment by assigning vertices of the at least one additional mesh to a peeling layer of the nearest vertices of the at least one mesh based on the predicted distance information related to the peeling layer of the garment from a viewpoint of the user device 102 using a nearest neighbor extrapolation method. In some embodiments, the 3D reconstruction server 108 assigns vertices to a peeling layer of all partitions of the dense mesh using a nearest neighbor extrapolation method. The nearest neighbor extrapolation method is a technique used to estimate the position of the seam or boundary between two regions of the garment based on neighboring pixel values of the sense mesh. In some embodiments, the seam estimating module 214 estimates the seam that is replicated across the adjacent partitions of the dense mesh to avoid artifacts near the seam boundary. The UV atlas constructing module 216 constructs a UV atlas for the dense mesh by parameterizing, using a UV parameterization method, the dense mesh based on the estimated seems of the dense mesh to improve the surface at each pixel in the dense image of the garment. The UV parameterization method UV parameterization is a technique that maps the set of 3D points or surfaces from a 3D space onto a 2D space, referred to as a UV space. In the UV parameterization, each point or vertex of the dense mesh in the 3D space is associated with a corresponding UV coordinate in the 2D space.

The process of UV parameterization involves unwrapping the surface of the 3D garment onto the 2D space. The UV atlas is a mapping or parameterization of the 3D surface of the garment onto the 2D space that is known as the UV space. The UV atlas is constructed by applying the textures to the dense mesh. The UV atlas assigns UV coordinates to the vertices of the 3D surface of the garment, which define how the surface's geometry is unwrapped and laid out in the 2D space. Each UV coordinate represents a specific point on the surface and corresponds to a particular location on the 2D plane. The UV coordinates define how the 2D texture or image should be mapped onto the 3D surface. The U coordinate represents a horizontal direction, and the V coordinate represents a vertical direction.

Once the UV atlas is created, the UV atlas act as a bridge between the 3D surface and the 2D textures of the garment. The UV atlas constructing module 216 applies the texture to the surface of the dense mesh by mapping the UV coordinates of the surface of the garment to corresponding the 3D points in the texture of the garment. The process of constructing the UV atlas unwraps the 3D surface in a way that minimizes distortion and maximizes the efficient use of texture space.

In some embodiments, the 3D garment reconstruction server 108 parametrizes all the partition(s) of the dense mesh separately and combines all the partition(s) of the parameterized dense mesh to construct the UV atlas that is related to mapping the vertices of each partition of the dense mesh to an individual UV map to avoid an overlap between each partition of the dense mesh. In some embodiments, UV parameters are local coordinates on a surface that is used to specify the location of one point over the surface of the dense mesh between the values zero and one. The improvement in the surface details of the garment may reconstruct hidden points in a complex body pose of the garment. The texture filing module 218 fills a texture in the constructed UV atlas by assigning RGB value for each pixel of the UV parametrized dense mesh by projecting the UV parametrized dense mesh from UV space to the corresponding RGB peel maps using an inpainting method if the regions are missed in the constructed UV atlas. The texture represents the three-dimensional shape and color of the garment. The inpainting method is a technique used to fill in missing regions of the texture. The inpainting method restores the missing regions that make the reconstructed garment image visually coherent.

The inpainting method analyzes surrounding pixels or regions of the missing area in the texture of the UV atlas to fill the missing area. The inpainting method maintains a structure, the texture, and the appearance of the 3D garment.

Figure 3:
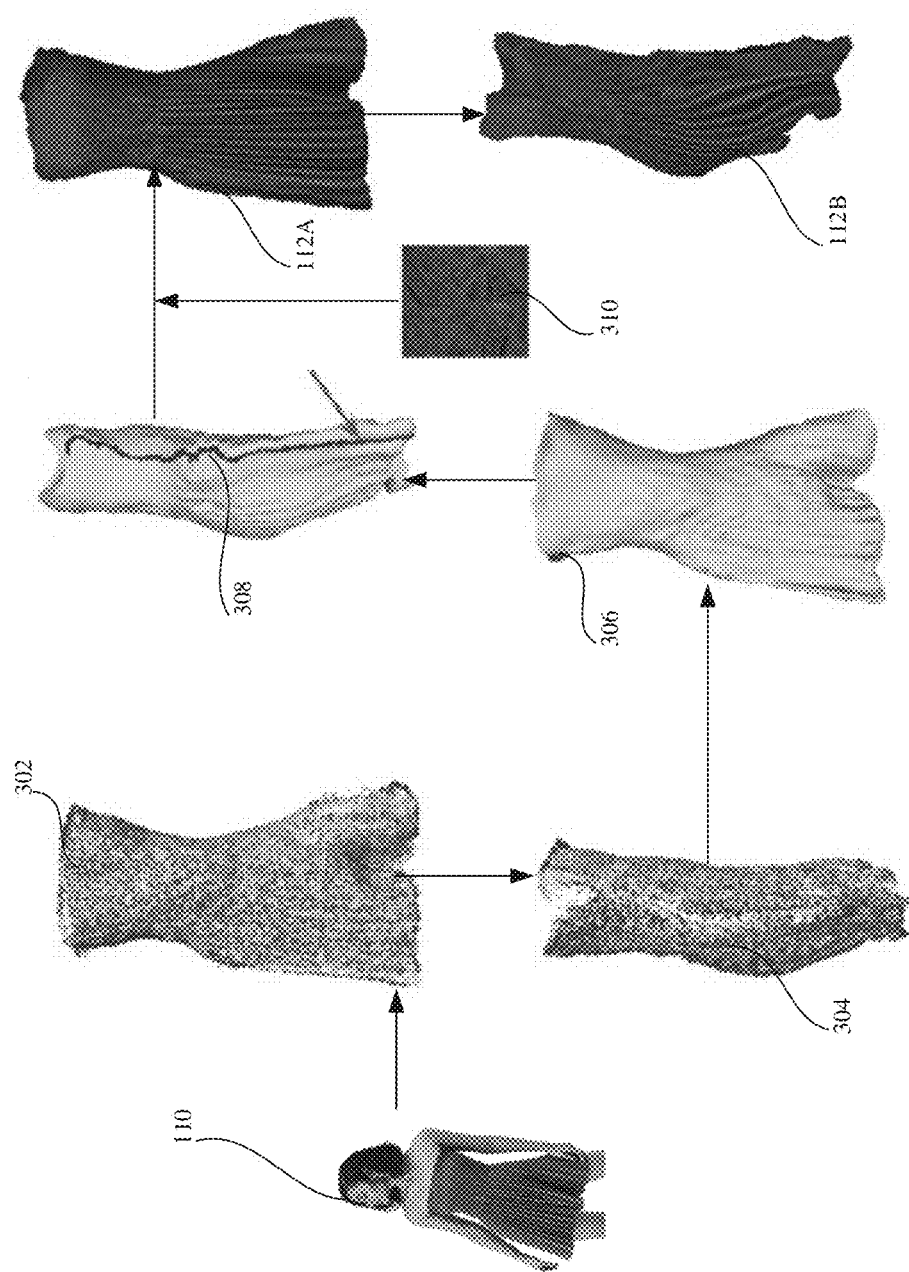
FIG. 3 illustrates exemplary images of the garment during the reconstruction of a 3D model of the garment according to some embodiments herein.

FIG. 3 illustrates exemplary images of the garment during the reconstruction of a 3D model of the garment according to some embodiments herein. The exemplary view of two-dimensional image 110 of the human model with the garment is shown. At 302, an exemplary view of an extracted image of the garment is shown. At 304, an exemplary view of the 3D point cloud images of the garment is shown. At 306, an exemplary view of the dense meshes of the 3D point cloud images is shown. At 308, an exemplary view of the seam on the dense mesh. At 310, an exemplary texture atlas is shown. At 112, an exemplary view of the reconstructed 3D images of the image of the garment is shown. At 112B, an exemplary side view (seem view) of the reconstructed 3D images of the image of the garment is shown.

Figure 4:
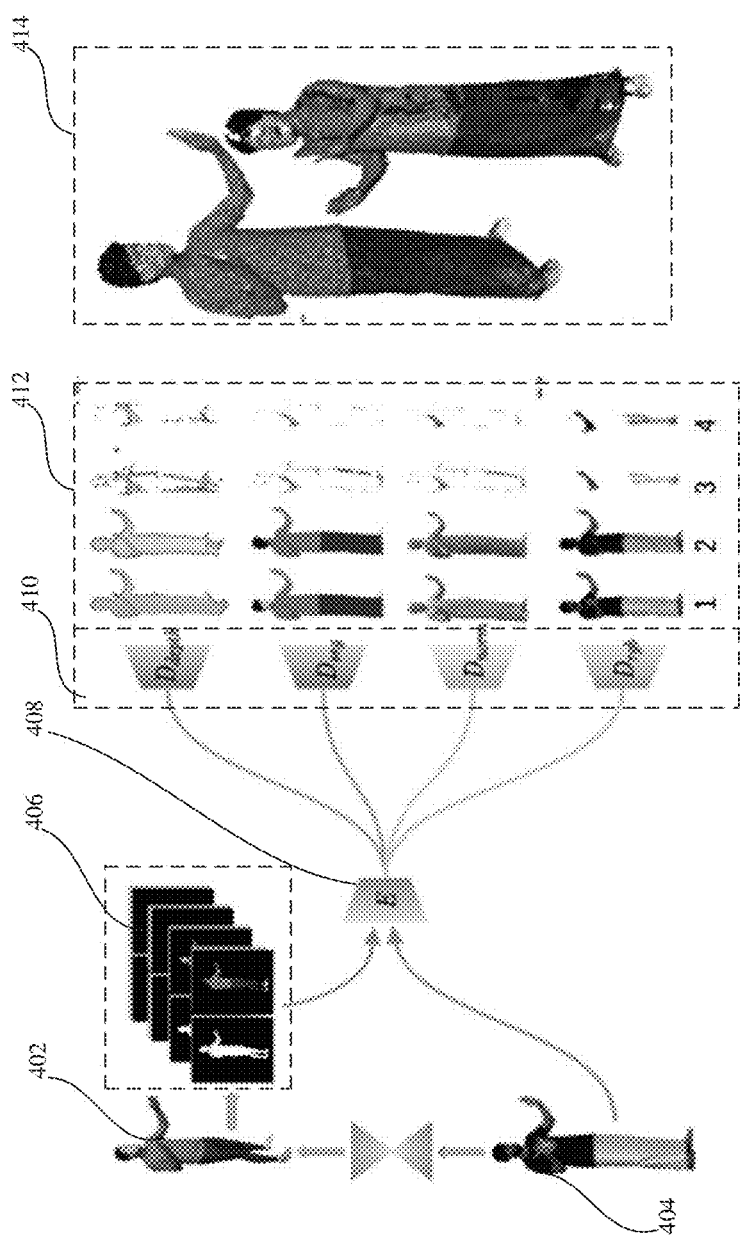
FIG. 4 illustrates exemplary images of a depth peel map, a segmentation peel map, a normal peel map, and an RGB peel map during the encoding process according to some embodiments herein.

FIG. 4 illustrates exemplary images of a depth peel map, a segmentation peel map, a normal peel map, and an RGB peel map during the encoding process according to some embodiments herein. The exemplary view of the image of a 2D human model with the garment is depicted at 404 which is received through the user device 102. The exemplary view of a skinned multi-person linear model (SMPL) mesh is depicted at 402. At 406, automatically selected from SMPL peeled priors are shown. Then, the image of the 2D human model with the garment, and the skinned multi-person linear model (SMPL) at 402 are fed to the encoder at 408. The encoder 408 encodes the image of the garment with the human model 404, and the skinned multi-person linear model (SMPL) mesh 402, and the encoded image of the 2D human model with the garment are fed to four decoders 410. The four decoders 410 may include Ddepth, Dseg, Dnorm, and Drgb. The exemplary view of a peeled human representation with the garment is depicted at 412 and is predicted by the Ddepth, Dseg, Dnorm & Drgb decoders 410. The exemplary view of a point cloud is depicted at 414 which is semantic.

Figure 5:
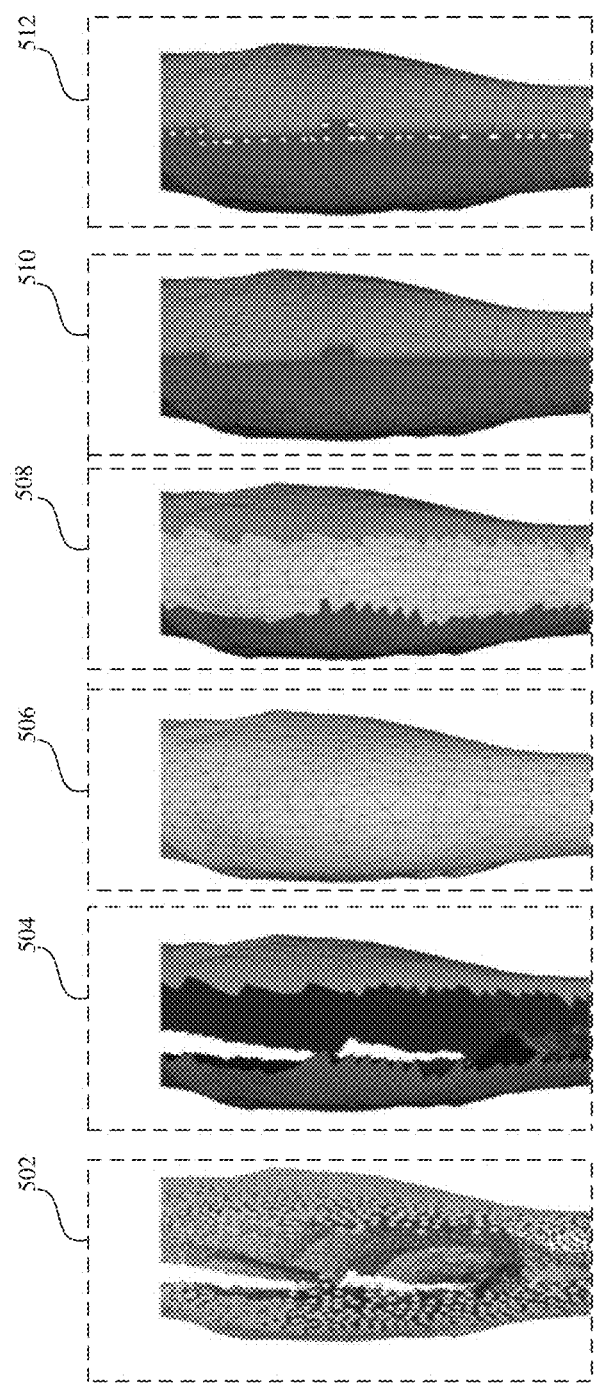
FIG. 5 illustrates exemplary point cloud images during the filling of missing regions and seam estimation in the garment according to some embodiments herein.

FIG. 5 illustrates exemplary point cloud images during the filling of missing regions and seam estimation in the garment according to some embodiments herein. The exemplary point cloud image depicts the missing regions at 502. The missing regions are adjacent to the user device 102 during the peeling process of the garment with respect to the viewpoint of the user device 102. The exemplary image of a point cloud depicts separated partial meshes at 504 for each depth peel map of the point cloud. The exemplary point cloud image depicts a single refined mesh or a dense mesh at 506 that is generated by combining separated partial meshes 504 and additional mesh. The additional mesh is generated by sampling the 3D points from the Poisson surface reconstruction of the point cloud. The exemplary point cloud image depicts vertices of the dense mesh assigned to a peeling layer of the dense mesh at 508 except vertices that fall within the filled regions of the dense mesh. The exemplary image of the point cloud depicts vertices within the dense mesh assigned to the peeling layer of the dense mesh at 510. The exemplary point cloud image depicts seam at 512. All boundary vertices of the dense mesh are the seam.

Figure 6:
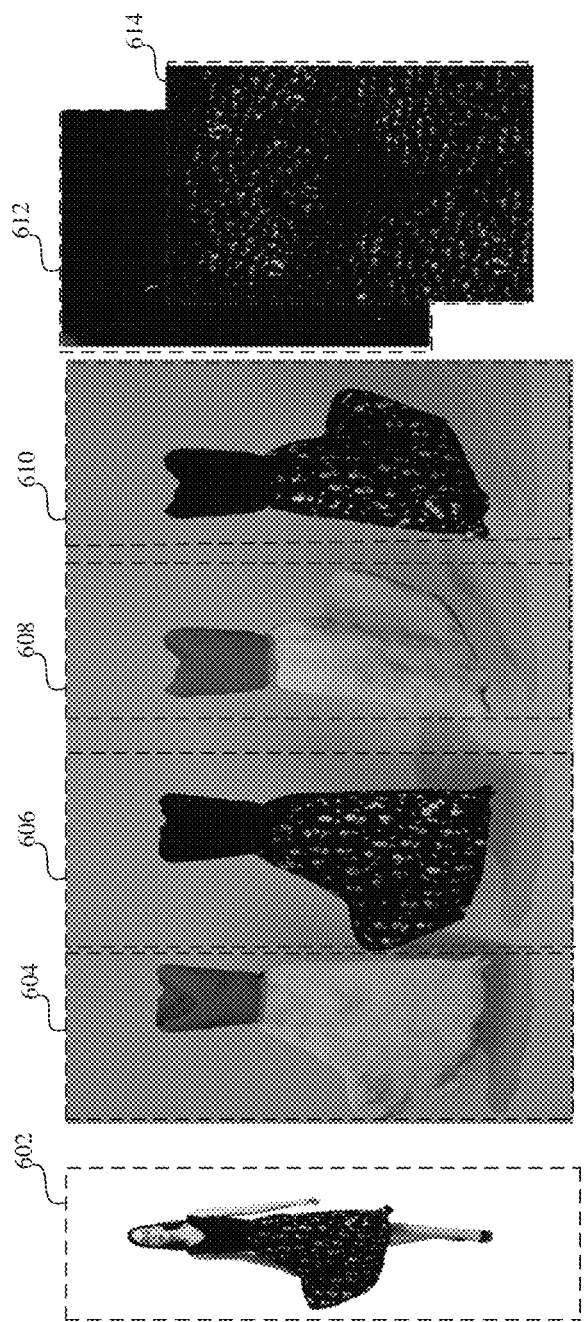
FIG. 6 illustrates exemplary images of reconstructed dense mesh with texture versus the reconstructed dense mesh without texture according to some embodiments herein.

FIG. 6 illustrates exemplary images of a reconstructed dense mesh of a garment with texture versus the reconstructed dense mesh of the garment without texture according to some embodiments herein. A 2D human model image with the garment is depicted at 602. A front side of the reconstructed dense mesh without texture is depicted at 604. The front side of the reconstructed dense mesh of the garment with texture is depicted at 606. A back side of the reconstructed dense mesh without texture is depicted at 608. The back side of the reconstructed dense mesh of the garment with texture is depicted at 610. A texture atlas for the top wear of the garment is depicted at 612. The texture atlas for the bottom wear of the garment is depicted at 614.

Figure 7:
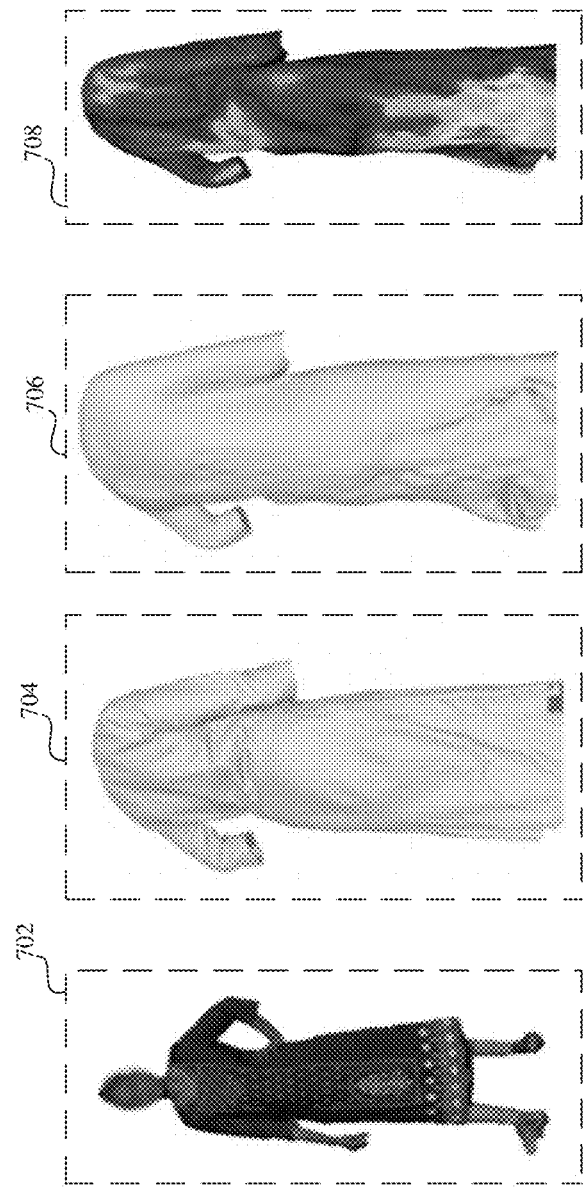
FIG. 7 illustrates exemplary images of higher fidelity geometric reconstruction of a garment with respect to a ground truth surface of the garment according to some embodiments herein.

FIG. 7 illustrates exemplary images of higher fidelity geometric reconstruction of a garment with respect to a ground truth surface of the garment according to some embodiments herein. The exemplary images depict an input image (i.e human model with a garment) at 702. The exemplary images depict a ground truth image of the dense mesh of the garment at 704. The exemplary images depict a dense mesh (i.e. refined garment from the input image) at 706. The exemplary images depict a textured garment that defines point-to-surface (P2S). The P2S metric quantifies an average L2 distance between each 3D point of the garment and an actual surface of the garment. A lower P2S value indicates a more accurate geometric reconstruction of the dense mesh with respect to the ground truth surface.

The 3D garment reconstruction server 108 assesses two garment classes (i.e the top wear and the bottom wear) to evaluate reconstruction error, so that, the 3D garment reconstruction server 108 uniformly sample a set of 3D points on the extracted garment surface and compute the Point-to-Surface (P2S) distance with the corresponding ground truth of the point cloud of the garment. For evaluating the segmentation label output, the 3D garment reconstruction server 108 calculates Intersection Over Union (IOU) scores for both the top wear and the bottom wear in all segmentation peel maps of the 3D image of the garment. Additionally, the 3D garment reconstruction server 108 computes the Normal Reprojection Error (NRE) separately for each class, excluding background to evaluate quality of the extracted garment surface. The Intersection Over Union (IOU) measures an overlap between the reconstructed and ground truth segmentation labels of the 3D garment. The overlap is an intersection area divided by a union area. The metric ranges from 0 to 1, with values closer to 1 indicating a higher matching between the reconstructed 3D garment and ground truth labels of the 3D garment. The NRE is computed by evaluating a L2 loss error between rendered normal maps (based on the input view) for the reconstructed and ground truth surfaces. A lower Normal Reprojection Error (NRE) value indicates a higher fidelity of reconstructed surface normals, reflecting a more accurate 3D garment representation.

Table: 1 depicts that digital warehouse (DW) dataset of the system 100 exhibits lower NRE compared to the other two datasets (THUman2.0 and 3DHumans datasets). The existing OccNet is trained based on the 3DHumans and THUman2.0 datasets. The P2S distance decreases means higher P2S values on the DW dataset compared to the other two datasets.

TABLE 1

| Dataset | Topwear | | | Bottomwear | | |
|---|---|---|---|---|---|---|
| | P2S ↓ | IOU ↑ | NRE ↓ | P2S ↓ | IOU ↑ | NRE ↓ |
| 3DHumans | 0.0087 | 0.82 | 0.089 | 0.0077 | 0.83 | 0.081 |
| THUman2.0 | 0.0079 | 0.80 | 0.094 | 0.0072 | 0.74 | 0.085 |
| DW | 0.0091 | 0.91 | 0.088 | 0.0083 | 0.95 | 0.073 |

Table: 2 Ablation without normal peelmaps

TABLE 2

| Dataset | Topwear | | Bottomwear | |
|---|---|---|---|---|
| | P2S ↓ | NRE ↓ | P2S ↓ | NRE ↓ |
| 3DHumans | 0.0091 | 0.118 | 0.0082 | 0.122 |
| THUman2.0 | 0.0088 | 0.182 | 0.0078 | 0.177 |
| DW | 0.0088 | 0.182 | 0.0089 | 0.097 |

The 3D garment reconstruction server 108 evaluates how the normal peelmaps absence affects the overall performance of the system 100. The 3D garment reconstruction server 108 measure and compares various metrics, such as the Point-to-Surface (P2S) distance, which quantifies the accuracy of the reconstructed surface geometry of the garment, and the Normal Reprojection Error (NRE) of the garment, and assesses the fidelity of the reconstructed surface normal of the garment.

The existing OccNet randomly selects a sample from the 3DHumans dataset and visualizes the P2S distance (with respect to the corresponding ground truth mesh) on the self-occluded (back side) of the garment. However, the OccNet does not incorporate provisions for semantic segmentation per garment class, nor the OccNet does ensure pixel-aligned reconstruction with the input image.

Table 3: The quantitative comparison with OccNet where the system 100 significantly outperforms OccNet for both top wear and bottom wear.

TABLE 3

| Dataset | Method | P2S ↓ (Topwear) | P2S ↓ (Bottomwear) |
|---|---|---|---|
| 3DHumans | OccNet (existing) | 0.0632 | 0.0363 |
| | System (100) | 0.0087 | 0.0077 |
| THUman2.0 | OccNet (existing) | 0.0609 | 0.0312 |
| | System (100) | 0.0079 | 0.0072 |

Figure 8:
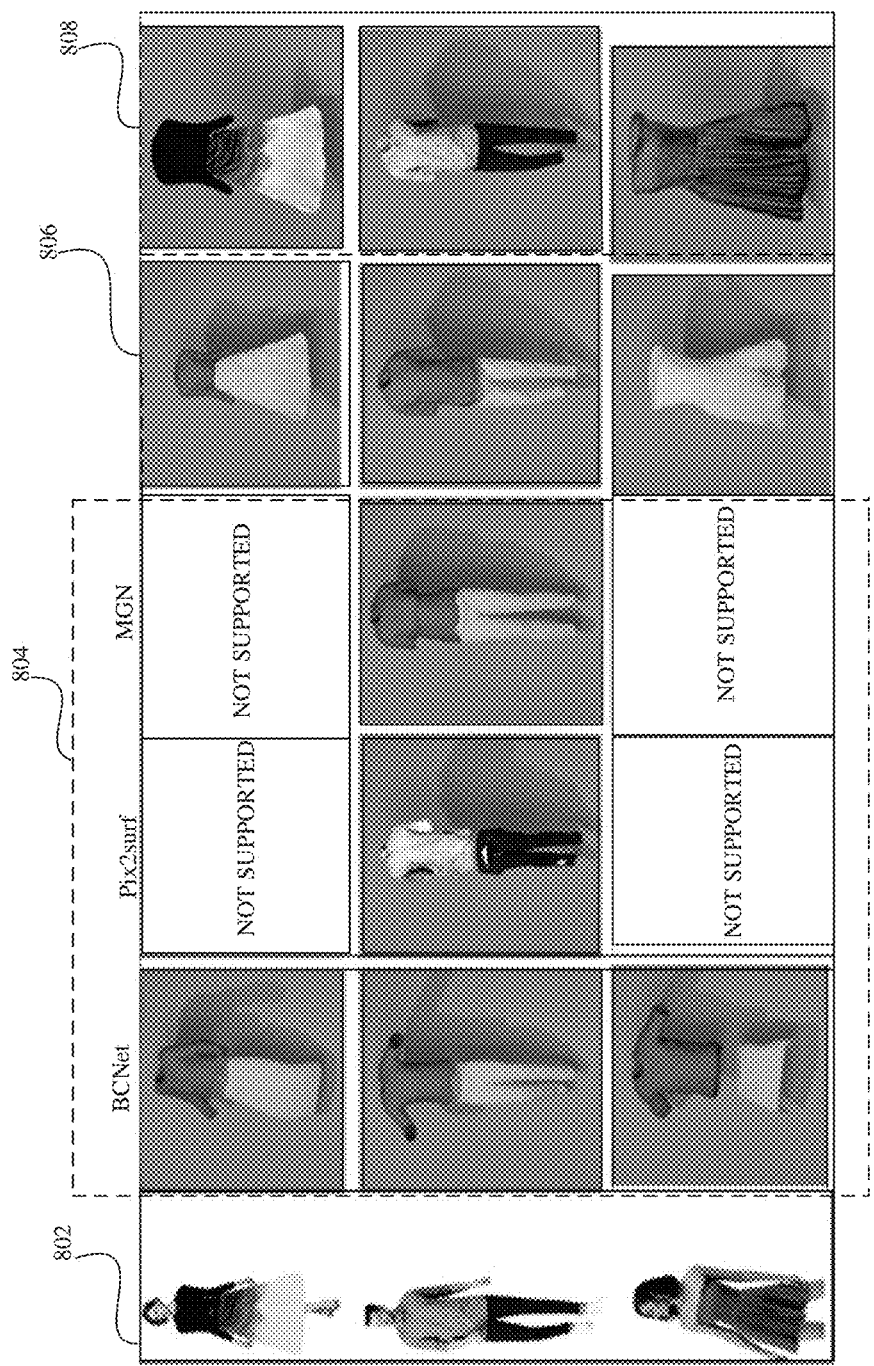
FIG. 8 illustrates a comparison between the reconstruction of garment images using a conventional method and the system implemented according to some embodiments herein.

FIG. 8 illustrates a comparison between the reconstruction of garment images using a conventional method and the system 100 according to some embodiments herein. Exemplary 2D images are depicted at 802. The exemplary images of the reconstructed garment images are depicted at 804. The exemplary images of the reconstructed garment images that are depicted at 804 are generated by the conventional method such as BCNet, MGN, Pix2Surf, and OccNet. The exemplary images at 806 depict reconstructed garment images. At 808, a high-quality textured meshes are shown. A "Not Supported" label as depicted in the figure indicates that the Pix2Surf and the MCN do not support garment images for reconstruction. The BCNet does not reconstruct the garment precisely. The system 100 recovers fine-grained geometrical details along with textured representations and exhibits the ability to generalize to loose and diverse garments with complex styles from other template-based approaches.

Figure 9:
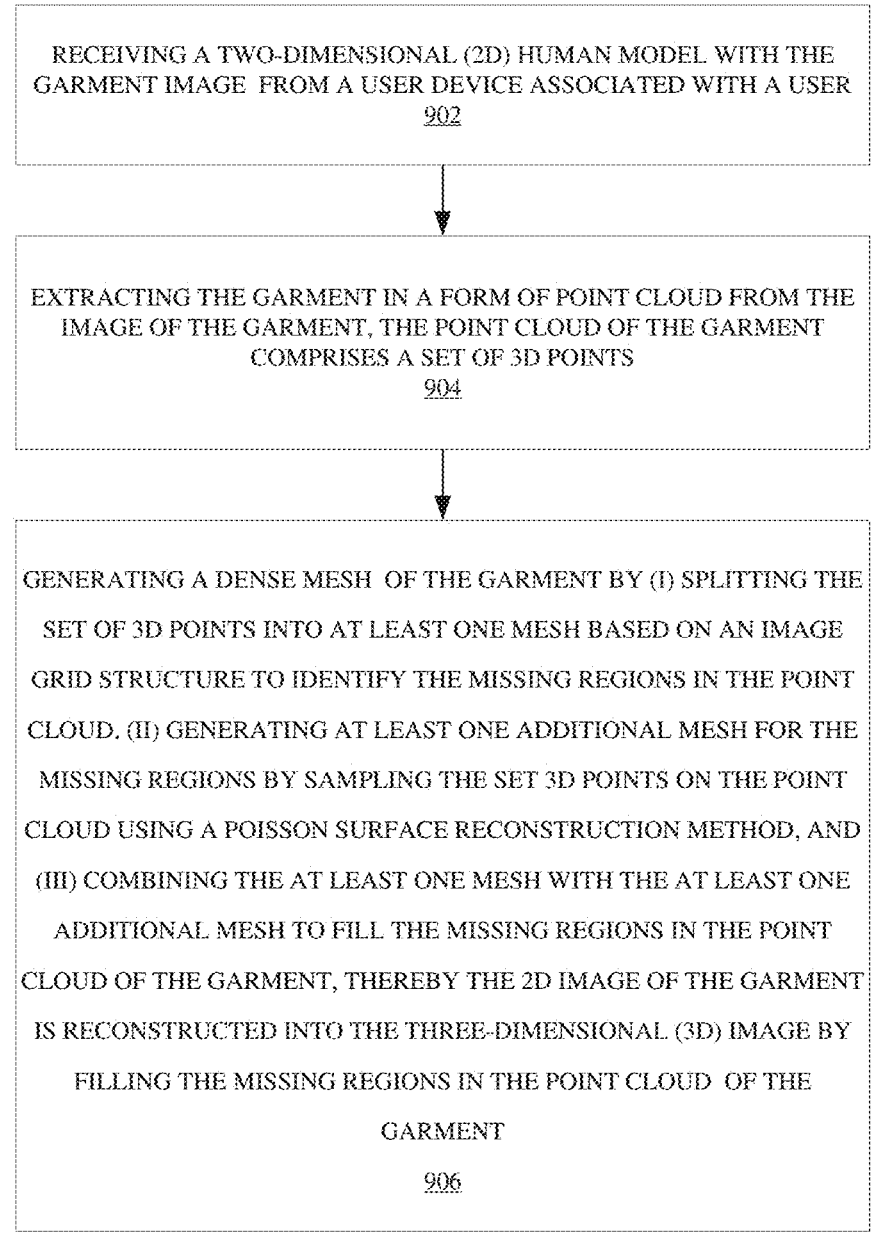
FIG. 9 is a flow diagram that illustrates a method for reconstructing a two dimensional (2D) image into a three-dimensional (3D) image by filling missing regions in a point cloud of the garment according to some embodiments herein.

FIG. 9 is a flow diagram that illustrates a method for reconstructing a two-dimensional (2D) image into a three-dimensional (3D) image by filling missing regions in a point cloud of the garment according to some embodiments herein. At a step 902, the method includes receiving a two-dimensional (2D) image from a user device associated with a user. The 2D image includes at least one of a human model, or a garment. At a step 904, the method includes representing the garment into a point cloud of the garment by extracting the garment from the 2D image. At a step 906, the method includes generating, using the point cloud of the garment, a dense mesh of the garment by (i) splitting the set of 3D points into at least one mesh based on an image grid structure to identify the missing regions in the point cloud, (ii) generating at least one additional mesh for the missing regions by sampling the set 3D points on the point cloud using a Poisson surface reconstruction method, and (iii) generating a dense mesh by combining the at least one mesh with the at least one additional mesh to fill the missing regions in the point cloud of the garment, thereby the 2D image of the garment is reconstructed into the three-dimensional (3D) image by filling the missing regions in the point cloud of the garment.

Figure 10:
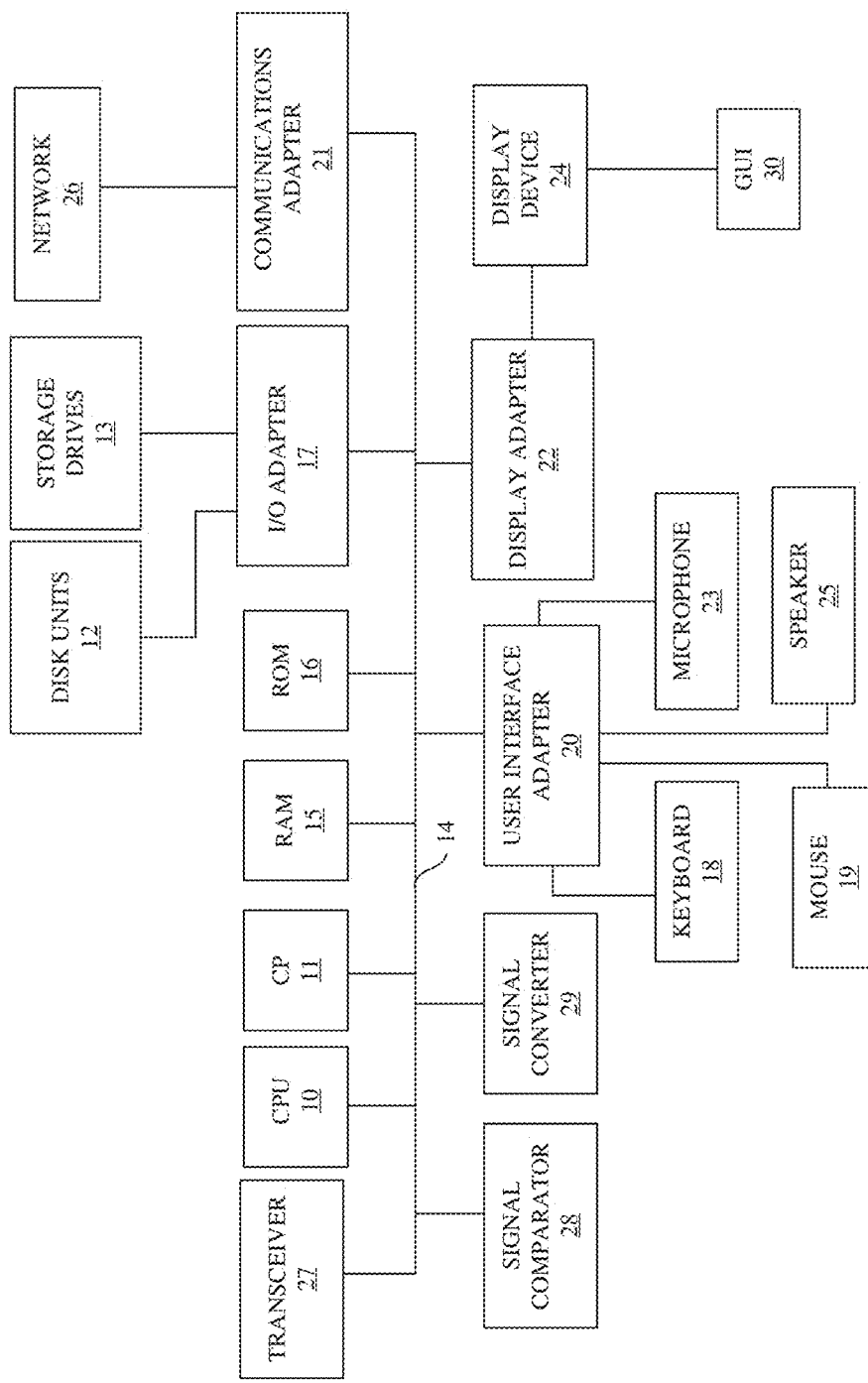
FIG. 10 is a schematic diagram of a computer architecture in accordance with the embodiments herein.

A representative hardware environment for practicing the embodiments herein is depicted in FIG. 10, with reference to FIGS. 1 through 9. This schematic drawing illustrates a hardware configuration of a 3D garment reconstruction server 108/computer system/computing device in accordance with the embodiments herein. The system includes at least one processing device CPU 10 that may be interconnected via system bus 14 to various devices such as a random-access memory (RAM) 12, read-only memory (ROM) 16, and an input/output (I/O) adapter 18. The I/O adapter 18 can connect to peripheral devices, such as disk units 38 and program storage devices 40 that are readable by the system. The system can read the inventive instructions on the program storage devices 40 and follow these instructions to execute the methodology of the embodiments herein. The system further includes a user interface adapter 22 that connects a keyboard 28, mouse 30, speaker 32, microphone 34, and/or other user interface devices such as a touch screen device (not shown) to the bus 14 to gather user input. Additionally, a communication adapter 20 connects the bus 14 to a data processing network 42, and a display adapter 24 connects the bus 14 to a display device 26, which provides a graphical user interface (GUI) 36 of the output data in accordance with the embodiments herein, or which may be embodied as an output device such as a monitor, printer, or transmitter, for example. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A processor-implemented method for reconstructing a two-dimensional (2D) image of a garment into a three-dimensional (3D) image by filling missing regions in a point cloud of the garment, the method comprising,
   receiving a two-dimensional (2D) image from a user device associated with a user, wherein the 2D image comprises at least one of a human model, or a garment;
   representing the 2D image of the garment into the point cloud of the garment by extracting the garment from the 2D image, wherein the point cloud of the garment comprises a set of 3D points;
   generating, using the point cloud of the garment, a dense mesh of the garment by,
      (i) splitting the set of 3D points into at least one mesh based on an image grid structure to identify the missing regions in the point cloud, wherein the at least one mesh comprises vertices that define a shape of the garment,
      (ii) generating at least one additional mesh for the missing regions by sampling the set of 3D points on the point cloud using a Poisson surface reconstruction method, and
      (iii) generating a dense mesh by combining the at least one mesh with the at least one additional mesh to fill the missing regions in the point cloud of the garment; and
   reconstructing the three-dimensional (3D) image of the garment by,
      automatically estimating, by a nearest neighbor extrapolation method, seams on the dense mesh of the garment by assigning vertices of the at least one additional mesh to a second peeling layer of nearest vertices of the at least one mesh based on a predicted distance information related to a first peeling layer of the garment from a viewpoint of the user device,
      constructing an ultraviolet (UV) atlas for the dense mesh by parameterizing, using a UV parameterization method, the dense mesh based on the seams of the dense mesh to improve the surface at each pixel in the dense mesh of the garment, and
      filling, using an inpainting method, a texture in the constructed UV atlas by assigning Red Green Blue (RGB) value for each pixel of the UV parametrized dense mesh by projecting the UV parametrized dense mesh from UV space to corresponding RGB maps if regions are missed in the constructed UV atlas, thereby reconstructing the 2D image of the garment into the 3D image by filling the missing regions in the point cloud of the garment.

2. The processor-implemented method of claim 1, wherein the method further comprises extracting the point cloud from the 2D image by,
   encoding the 2D image using a skinned multi-person linear model (SMPL) to determine an encoded 2D image, wherein the SMPL is a parametric model for representing a human body shape and pose;
   decoding the encoded 2D image and the SMPL to determine a decoded 2D image;
   predicting (i) depth peel maps, (ii) segmentation peel maps, (iii) normal peel maps, and (iv) the red green blue (RGB) maps of the 2D image using the decoded 2D image, wherein the depth peel maps comprise the predicted distance information related to the first peeling layer of the garment from the viewpoint of the user device, wherein the segmentation peel maps comprise a predicted segmentation label for each pixel in the 2D image of the garment, wherein the normal peel maps comprise a predicted orientation or a direction of a surface at each pixel in the 2D image of the garment, wherein the normal peel maps comprise a plurality of attributes of the surface at each pixel in the 2D image of the garment; and
   extracting, using a back projection method, the point cloud of the garment by back projecting the predicted depth peel maps of the 2D image of the garment onto the 3D space using the predicted segmentation label for each pixel in the 2D image of the garment and the predicted orientation or direction of the plurality of attributes of the surface at each pixel in the 2D image of the garment.

3. A system for reconstructing a two-dimensional (2D) image of a garment into a three-dimensional (3D) image by filling missing regions in a point cloud of the garment, the system comprising,
a user device comprises an image-capturing device to capture a two-dimensional (2D) image; and
a three-dimensional garment reconstruction server communicatively connected to the user device, wherein the three-dimensional garment reconstruction server comprises,
a memory that comprises a set of instructions, and
a processor executes the set of instructions and is configured to,
receive the two-dimensional (2D) image from a user device associated with a user, wherein the 2D image comprises at least one of a human model, or a garment;
represent the 2D image of the garment into the point cloud of the garment by extracting the garment from the 2D image, wherein the point cloud of the garment comprises a set of 3D points;
generating, using the point cloud of the garment, a dense mesh of the garment by,
i) splitting the set of 3D points into at least one mesh based on an image grid structure to identify the missing regions in the point cloud, wherein the at least one mesh comprises vertices that define a shape of the garment,
(ii) generating at least one additional mesh for the missing regions by sampling the set of 3D points on the point cloud using a Poisson surface reconstruction method, and
(iii) generating a dense mesh by combining the at least one mesh with the at least one additional mesh to fill the missing regions in the point cloud of the garment; and
reconstruct the three-dimensional (3D) image by,
automatically estimate, by a nearest neighbor extrapolation method, seams on the dense mesh of the garment by assigning vertices of the at least one additional mesh to a second peeling layer of nearest vertices of the at least one mesh based on a predicted distance information related to the first peeling layer of the garment from a viewpoint of the user device,
construct an ultraviolet (UV) atlas for the dense mesh by parameterizing, using a UV parameterization method, the dense mesh based on the seams of the dense mesh to improve the surface at each pixel in the dense mesh of the garment; and
fill, using an inpainting method, a texture in the constructed UV atlas by assigning Red Green Blue (RGB) value for each pixel of the UV parametrized dense mesh by projecting the UV parametrized dense mesh from UV space to corresponding RGB maps if regions are missed in the constructed UV atlas, thereby reconstructing the 2D image of the garment into the 3D image by filling the missing regions in the point cloud of the garment.

4. The system of claim 3, wherein the point cloud is extracted from the 2D human model with the garment image by,
encoding the 2D image using a skinned multi-person linear model (SMPL) to determine an encoded 2D image, wherein the SMPL is a parametric model for representing a human body shape and pose;
decoding the encoded 2D image and the SMPL to determine a decoded 2D image;
predicting (i) depth peel maps, (ii) segmentation peel maps, (iii) normal peel maps, and (iv) the red green blue (RGB) maps of the 2D image using the decoded 2D image, wherein the depth peel maps comprise the predicted distance information related to the first peeling layer of the garment from the viewpoint of the user device, wherein the segmentation peel maps comprise a predicted segmentation label for each pixel in the 2D image of the garment, wherein the normal peel maps comprise a predicted orientation or a direction of a surface at each pixel in the 2D image of the garment, wherein the normal peel maps comprise a plurality of attributes of the surface at each pixel in the 2D image of the garment; and
extracting, using a back projection method, the point cloud of the garment by back projecting the predicted depth peel maps of the 2D image of the garment onto the 3D space using the predicted segmentation label for each pixel in the 2D image of the garment and the predicted orientation or direction of the plurality of attributes of the surface at each pixel in the 2D image of the garment.

5. One or more non-transitory computer readable storage mediums configured with instructions executable by one or more processors to cause the one or more processors to perform a method for reconstructing a two-dimensional (2D) image of a garment into a three-dimensional (3D) image by filling missing regions in a point cloud of the garment, comprising:
receiving a two-dimensional (2D) image from a user device associated with a user, wherein the 2D image comprises at least one of a human model, or a garment;
representing the 2D image of the garment into the point cloud of the garment by extracting the garment from the 2D image, wherein the point cloud of the garment comprises a set of 3D points;
generating, using the point cloud of the garment, a dense mesh of the garment by,
(i) splitting the set of 3D points into at least one mesh based on an image grid structure to identify the missing regions in the point cloud, wherein the at least one mesh comprises vertices that define a shape of the garment,
(ii) generating at least one additional mesh for the missing regions by sampling the set of 3D points on the point cloud using a Poisson surface reconstruction method, and
(iii) generating a dense mesh by combining the at least one mesh with the at least one additional mesh to fill the missing regions in the point cloud of the garment; and
reconstructing the three-dimensional (3D) image by,
automatically estimating, by a nearest neighbor extrapolation method, seams on the dense mesh of the garment by assigning vertices of the at least one additional mesh to a second peeling layer of nearest vertices of the at least one mesh based on a predicted distance information related to a first peeling layer of the garment from a viewpoint of the user device,
constructing an ultraviolet (UV) atlas for the dense mesh by parameterizing, using a UV parameterization method, the dense mesh based on the seams of the dense mesh to improve the surface at each pixel in the dense mesh of the garment, and filling, using an inpainting method, a texture in the constructed UV atlas by assigning Red Green Blue (RGB) value for each pixel of the UV parametrized dense mesh by projecting the UV parametrized dense mesh from UV space to corresponding RGB maps if regions are missed in the constructed UV atlas, thereby reconstructing the 2D image of the garment into the 3D image by filling the missing regions in the point cloud of the garment.

6. The one or more non-transitory computer-readable storage mediums storing the one or more sequences of instructions of claim 5, wherein the method further comprises extracting the point cloud from the 2D human model with the garment image by encoding the 2D image using a skinned multi-person linear model (SMPL) to determine an encoded 2D image, wherein the SMPL is a parametric model for representing a human body shape and pose;

decoding the encoded 2D image and the SMPL to determine a decoded 2D image;

predicting (i) depth peel maps, (ii) segmentation peel maps, (iii) normal peel maps, and (iv) the red green blue (RGB) maps of the 2D image using the decoded 2D image, wherein the depth peel maps comprise the predicted distance information related to the first peeling layer of the garment from the viewpoint of the user device, wherein the segmentation peel maps comprise a predicted segmentation label for each pixel in the 2D image of the garment, wherein the normal peel maps comprise a predicted orientation or a direction of a surface at each pixel in the 2D image of the garment, wherein the normal peel maps comprise a plurality of attributes of the surface at each pixel in the 2D image of the garment; and extracting, using a back projection method, the point cloud of the garment by back projecting the predicted depth peel maps of the 2D image of the garment onto the 3D space using the predicted segmentation label for each pixel in the 2D image of the garment and the predicted orientation or direction of the plurality of attributes of the surface at each pixel in the 2D image of the garment.

* * * * *